UNITED STATES PATENT OFFICE.

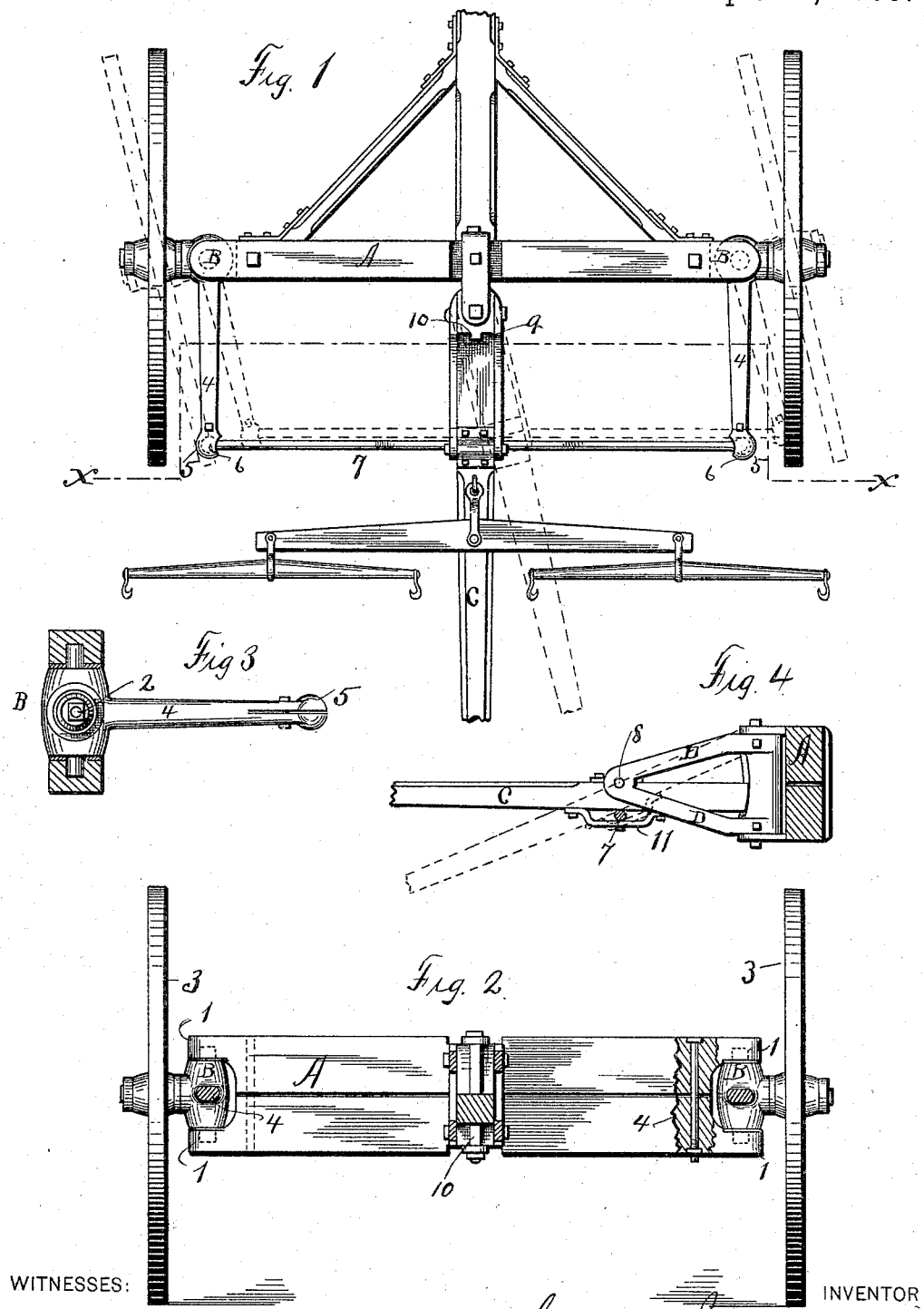

ADNIRAM J. COOK, OF TROY, NEW YORK.

VEHICLE-GEAR.

SPECIFICATION forming part of Letters Patent No. 495,544, dated April 18, 1893.

Application filed November 25, 1892. Serial No. 452,970. (No model.)

*To all whom it may concern:*

Be it known that I, ADNIRAM J. COOK, of Troy, in the county of Rensselaer, in the State of New York, have invented new and useful Improvements in Vehicle-Gears, of which the following, taken in connection with the accompanying drawings, is a full, clear, and exact description.

My invention relates to wagon gears, and more particularly to the mounting of the forward wheels upon short axles, which are pivoted separately to the frame.

My object is to produce a gear which shall primarily prevent the lateral thrust of the tongue, more commonly known as "whipping," when either of the forward wheels strikes an obstacle; and the further object of preventing the wagon from losing its momentum when it strikes an obstacle, and adapted to turn in a minimum amount of space; cheap, durable in construction and of great utility.

My invention consists in the several novel features of construction and operation hereinafter described and which are specifically set forth in the claim hereunto annexed. It is constructed as follows, reference being had to the accompanying drawings, in which Figure 1, is a top plan view of the forward part of the gear to which my invention particularly applies, showing it connected with the pole. Fig. 2, is a front view thereof, the pole and arms connecting it with the short axles, removed. Fig. 3, is a view of the short axle complete, detached. Fig. 4, is a side view of the pole mounted, showing the vertical play in dotted lines.

Similar letters and figures of reference indicate corresponding parts.

A—, is the forward cross-bar and serves the ordinary functions of an axle and may be constructed wholly of one piece, or in sections, as shown and provided with ears —1— at each end, in which the short axles —B— are pivotally mounted, as shown and provided with an axle arm or bearing —2— upon which the wheel —3— is mounted in the ordinary way. Each of the axles —B— is provided with an arm —4— extending forwardly and having its outer end provided with a slotted socket-joint —5— which is adapted to receive the ball or enlargement — 6— upon the ends of the cross rod —7—, for the purpose of forming a rigid connection between the ends of the arms —4—, and is secured to the pole —C— at the point where it crosses it so that any lateral movement of the pole will turn the axles so as to cause the wheels to move in similar circles and always to be parallel with each other, as shown in dotted lines in Fig. 1. The pole —C— is mounted in a bracket —D— and pivoted at —8— and having a groove —9— in its rear end, in which the tongue —10— in the rear end of said bracket is adapted to travel, so that the pole may play readily vertically. The rod —7— is confined by a strap —11— to permit of forward and backward movement. It will thus be observed that when either of the wheels strikes an obstacle it will simply be forced laterally as shown in dotted lines, and the wagon take a new course and will continue in such course until straightened around again by the motive force. It will also be observed that when one of the wheels strikes an obstacle, that instead of losing its momentum it will simply cause the gears to move laterally and allow the wheel to pass around the obstacle without materially impeding the force.

What I claim as my invention, and desire to secure by Letters Patent, is—

The combination with the cross bar, of the axles mounted vertically therein, and having forwardly extending arms, a rod connecting said arms, a bracket —D— secured to the cross bar and having a tongue in its rear end, a pole having a groove in its rear end, pivotally mounted in said bracket, the tongue adapted to travel in said groove and a strap to limit the travel of the rod connecting the arms; as set forth.

In witness whereof I have hereunto set my hand this 19th day of November, 1892.

ADNIRAM J. COOK.

In presence of—
 EUGENE N. DUNN,
 ED. M. KONINSKY.